United States Patent [19]

Takasu

[11] Patent Number: 5,235,430
[45] Date of Patent: Aug. 10, 1993

[54] FACSIMILE SYSTEM WITH SIMPLIFIED DETECTION OF CHANGING POINTS TO REALIZE HIGH SPEED MR CODING OPERATION

[75] Inventor: Akihide Takasu, Fussa, Japan

[73] Assignee: Casio Computer Co., Ltd., Tokyo, Japan

[21] Appl. No.: 681,083

[22] Filed: Apr. 5, 1991

[30] Foreign Application Priority Data

Apr. 17, 1990 [JP] Japan ................................. 2-99418

[51] Int. Cl.$^5$ ........................................... H04N 1/419
[52] U.S. Cl. ............................... 358/261.3; 358/261.2
[58] Field of Search ................................. 358/426–427, 358/261.1–261.4, 262.1

[56] References Cited

U.S. PATENT DOCUMENTS

| | | | |
|---|---|---|---|
| 4,654,719 | 3/1987 | Tomita | 358/261.3 |
| 4,760,460 | 7/1988 | Shimotohno | 358/261.2 |
| 4,799,110 | 1/1989 | Hisada et al. | 358/261.3 |
| 5,056,154 | 10/1991 | Aono et al. | 358/261.1 |
| 5,136,396 | 8/1992 | Kato et al. | 358/261.2 |

*Primary Examiner*—Stephen Brinich
*Attorney, Agent, or Firm*—Frishauf, Holtz, Goodman & Woodward

[57] ABSTRACT

In an MR coding operation for processing a facsimile image, relationships among changing pixels "a1", "a2", "b1" and "b2" are judged, and then after performing process operations of a horizontal mode and a vertical mode, confirmation is made whether or not the changing pixels "b1" and "b2" must be newly checked. When the changing pixels "b1" and "b2" are not required for a new detection, the changing pixels "b1" and "b2" which have been obtained during the preceding coding operation are employed in the subsequent coding operation. As a consequence, the operation to obtain the changing points in the pixels can be omitted and thus a highspeed coding process may be achieved.

7 Claims, 4 Drawing Sheets

FACSIMILE SYSTEM WITH SIMPLIFIED DETECTION OF CHANGING POINTS TO REALIZE HIGH SPEED MR CODING OPERATION

BACKGROUND OF THE INVENTION

1. Field of the Invention

The present invention generally relates to a facsimile image processing system. More specifically, the present invention is directed to an improvement in an MR (Modified READ) coding system for binary-coded images.

2. Description of the Related Art

Very recently, in facsimile apparatuses, the MR (modified READ) coding method regulated by C.C.I.T.T. (International Telegraph and Telephone Consulatative Commitee) has been usually employed as the method for coding binary-coded images.

Such an MR coding method is constructed of three typical modes, i.e., the pass mode, vertical mode and horizontal mode, and is operated in that the coding operation is sequentially carried out in combination with the positions of the respective color changing pixels on the coding line and the positions of the reference pixels either on the coding line, or immediately before this coding line.

FIG. 3 is a flowchart for showing the conventional two-dimensional coding operation by the MR coding system.

Assuming now such an image data as shown in FIG. 4a, when a pixel with a starting point "a0" is determined as shown in this figure, a detection is made at a step A3 to a first color changing pixel "a1" positioned at a right side of the starting point "a0" and also another detection is made at a step A4 to first and second color changing pixels "b1" and "b2" positioned at the right side of the starting point "a0" on a reference line in accordance with the conventional MR coding flow. Then, the process is advanced to a step A5 at which a check is made whether or not the second changing pixel "b2" is smaller than the first changing pixel "b1". In other words, a check is made whether "b2" is present at a right hand of "a1" or not. In this case, since the second changed pixel "b2" is positioned at a right hand of the first changing pixel "a1", this judgement result becomes "NO", and thereafter the process is advanced to a step A6 at which another check is made: $|a1\ b1| \leq 3$. In this case, as the relative distance between "a1" and "b1" is equal to "3" and thus the judgement result becomes "YES", then the process is advanced to a step A7 whereby the coding operation is performed in the vertical mode. Then, the process is advanced to a step A8 at which the first changing pixel "a1" is set to the pixel "a0" with the starting point for the succeeding coding operation. Thereafter, the process is returned via the step A9 to the previous step A3, at which the changing pixels "a1", "b1" and "b2" are detected again so that the above-described operation is repeated.

In case that such an image data as shown in FIG. 4b is processed, a judgement is made at the step A5 whether or not the second changing pixel "b2" is smaller than the first changing pixel "a1". In this case, since the second changing pixel "b2" is positioned at a right side of the first changing pixel "a1", the judgement result becomes "NO" and the process is advanced to a step A6 at which another judgement is carried out whether or not $|a1\ b1| \leq 3$. Since the relative distance between the first changing pixels "a1" and "b1" is longer than 3 and therefore the judgement result becomes NO, the process is advanced via steps A10 and A11 to a step A13, so that the coding operation is performed in the horizontal mode. Then, a changing pixel "a2" is set to a changing pixel "a0" for the subsequent coding operation at a step A14 and the process is advanced through a step A9 to the previous step A3, at which the above-described changing pixels "a1", "b1" and "b2" are newly and sequentially detected, whereby the above-described MR coding operation is repeated.

In accordance with the above-described conventional MR coding method or system, during the vertical mode represented in FIG. 4a, when the first changing pixel "a1" is set to a changing pixel "a0" for the next coding operation at the step A8, such a detection is performed as follows. That is to say, although the first changing pixel (b1) having the color opposite to that of the changing pixel (a0) positioned at the right hand with respect to the changing pixel (a0) on the first reference line, is the same as the previous changing pixel "b2", this first changing pixel (b1) is newly detected as (b1) at the subsequent step A4.

Also in the case when the changing pixel "a2" is set to the pixel (a0) for the subsequent coding operation in the horizontal mode shown in FIG. 4b, the following detecting operation is performed. Although both the first changing pixel (b1) having the color opposite to that of the changing pixel (a0) positioned at the right side of this changing pixel (a0) on the reference line, and also the first changing pixel (b2) positioned at the right side of the changing pixel (b1) on the reference line are the same as the previous changing pixels "b1" and "b2", these changing pixels "b1" and "b2" are newly detected as the pixels "b1" and "b2" at the subsequent step A4.

This implies that the previously checked changing points are again checked. As a result, a total number of detection process operations become very large for the changing points of the coding operation. Thus, large time consuming is required to detect such changing points, which impedes highspeed coding operations.

SUMMARY OF THE INVENTION

The present invention has been made in an attempt to solve the above-described drawbacks, and therefore, has an object to provide a facsimile coding system capable of greatly reducing a detecting operation for a changing point during a coding operation, and of realizing a highspeed MR coding operation.

A facsimile system for coding an image in an MR method, according to the present invention, comprises:

a memory for storing therein image data read out during at least two lines;

detecting means for sequentially reading out pixel data of both a coding line and a reference line from the image data stored in the memory, so as to detect changing points from white to black and from black to white;

storage means for storing positional information on a pixel corresponding to the changing points detected by the detecting means, said positional information relating to a0, a1, a2, b1, and b2 employed in an MR coding operation;

first judging means for judging whether or not a1 is positioned in between b1 and b2 in a coding operation of a vertical mode; and control means for prohibiting a new detecting operation for b1 with respect to a subsequent coding process when said judging means judges that a1 is present between b1 and b2, thereby to rewrite a value of b1 stored in the storage means by a value of b2.

BRIEF DESCRIPTION OF THE DRAWINGS

For a better understanding of the present invention, reference is made to the following description in conjunction with the accompanying drawings, in which.

Figure 1:
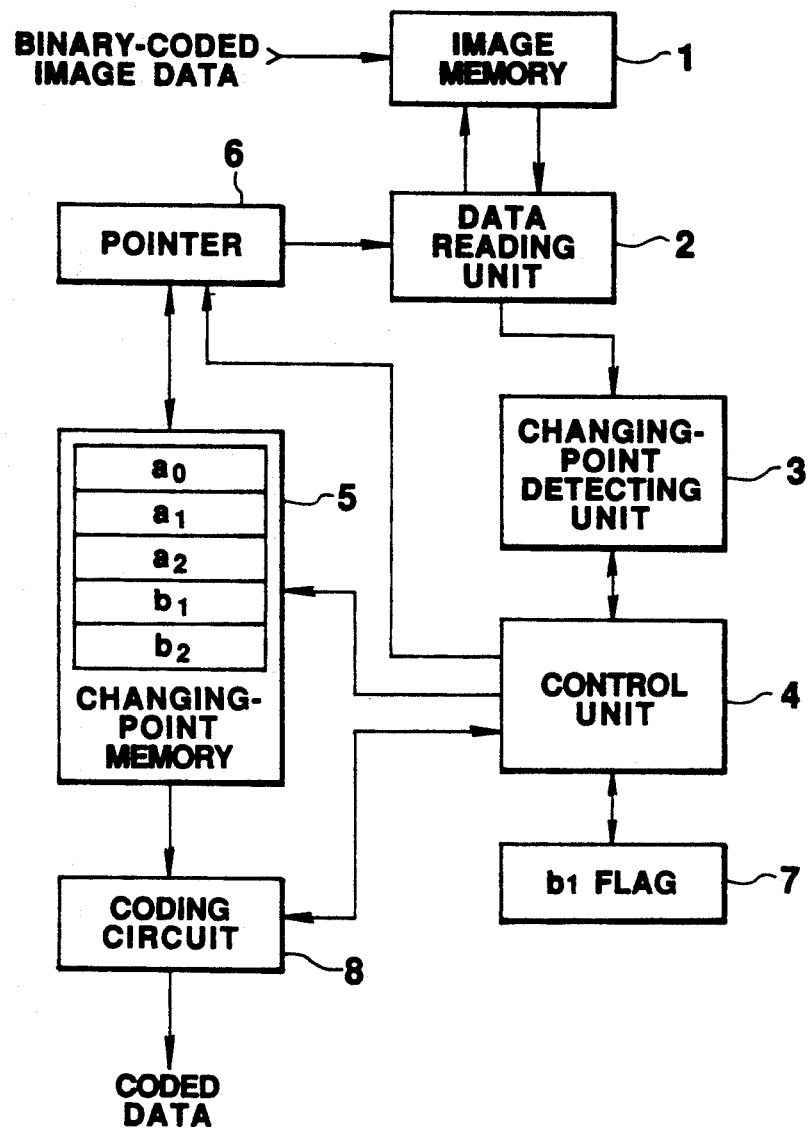
FIG. 1 is a schematic block diagram for showing a coding apparatus to which the present invention has been applied.

DETAILED DESCRIPTION OF THE PREFERRED EMBODIMENTS
Circuit Arrangement of Coding Apparatus FIG. 1 represents a circuit arrangement according to one preferred embodiment of the present invention. In FIG. 1, reference numeral 1 denotes an image memory which will store therein binary-coded image data obtained by reading an original (not shown). Then, the image data stored in this image memory 1 is read out by a data reading unit 2. In response to a value of a pointer 6, this data reading unit 2 reads out such image data as the coding line and also reference line represented in FIG. 4. The image data read by the data reading unit 2 is sent to a unit 3 for detecting a changing point. The changing-point detecting unit 3 will judge whether each of these image data is white or black in unit of one pixel, while reading the image data, and also will detect a changing point from white to black, or from black to white.

The detection results from the changing-point detecting unit 3 is sent to a control unit 4. A function of this control unit 4 is to produce control instructions to various circuits, e.g., the above-described changing-point detecting unit 3, a changing-point memory 5, a pointer 6, a b1-flag 7 and a coding circuit 8, respectively.

The changing-point memory 5 stores therein positions of the respective changing pixels required for the MR coding operation. Accordingly, the changing-point memory 5 stores a changing pixel "a0" at a starting point on the coding line; a first changing pixel "a1" positioned at a right side of the changing pixel "a0" on the coding line; a first changing pixel "a2" positioned at a right side of the changing pixel "a1" on the coding line; a first changing pixel "b1" having color opposite to that of the changing pixel "a0" and positioned at a right side thereof on the reference line; and furthermore a first changing pixel "b2" positioned at a right side of the changing pixel "b1" on the reference line. The function of the pointer 6 is to point out to which pixel positioned from left ends of the respective lines, each pixel belongs. As a consequence, values of pointer 6 obtained when the changing points are detected by the changing-point detecting unit 3 are stored in the charging-point memory 5. The function of the b1-flag 7 is to be set to either "1" or "0" in response to the instruction derived from the control unit 4, and also to instruct either detecting the changing pixel "b1", or not detecting it. Finally, the function of the coding circuit 8 is to perform the MR coding operation with employment of the data stored in the changing-point memory 5 in response to the instruction derived from the control unit 4.

MR Coding Operation

The MR coding operation effected by the above-described MR coding apparatus with the circuit arrangements will now be described with reference to a flowchart shown in FIG. 2.

Upon completion of a one-dimensional coding operation for 1 line, a signal "EOL+0" for representing that a subsequent line corresponds to a two-dimensional coding operation is sent out at a step B1. At a next step B2, the changing pixel "a0" is set to zero and the changing pixel "a0" is set to a imaginary pixel positioned immediately before a first pixel of the coding line. At a step B3, the b1-flag 7 is set to "1" and the changing pixel "a1" is detected at a step B1. The detection of the changing pixel "a1" is performed in such a manner that the value of "a0" in the changing-point memory 5 is entered in the pointer 6, the pixels are read while incrementing the pointer 6, and the color changings are detected by the changing-point detecting unit 3. The above-described process operations are the same as those of the conventional flow operation as the initial operation for coding 1 line. However, since a detection of pixel "b" is determined based upon the value "0" or "1" of the b1-flag 7, the process as defined at the step B3 has been added as the initial operation.

Subsequently, the process is advanced to a step B5, at which a check is made whether or not the b1-flag has been set. Since the b1-flag 7 has been set to "1" and therefore the judgement result becomes "YES", the process is advanced to a step B6 at which the pixel "b1" is detected and then the process is advanced to a step B7. This "b1" detection is carried out in such a manner that the value of the changing pixel "a0" is entered into the pointer 6, the reference pixels are read while incrementing the pointer 6, and the color changings is detected by the changing-point detecting unit 3.

Figure 4A:
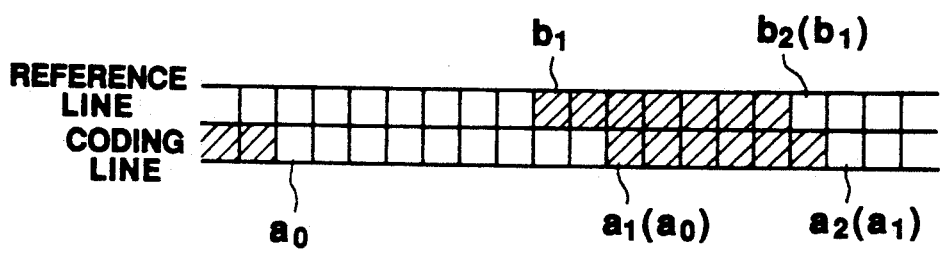
FIG. 4a-4b illustrate an example of image data employed to explain the operations of the MR coding process.

At a step B7, another judgement is made by the coding circuit 8 whether or not $a1 \leq b1$. Assuming now that the image data shown in FIG. 4a is to be processed, since the changing pixel "a1" is positioned at a right side of the changing pixel "b1" and therefore the judgement result becomes "NO", a detection is made of the changing pixel "b2" at a step 8. This detection of the changing pixel "b2" is achieved in such a manner that the value of the changing pixel "b1" is entered to the pointer 6, the pixels on the reference line are read out while incrementing this pointer 6, whereby the changing-point detecting unit 3 detects the changing points. Then, the process is advanced to a step B9 at which a check is made whether or not the changing pixel "b2" is smaller than the changing pixel "a1". In this case, since the changing pixel "b2" is positioned at a right side of the changing pixel "a1" and the judgement result becomes "NO", the process is advanced to a step B10 at which another judgement is established: $|a1\ b1| \leq 3$. Since the relative distance between these changing pixels "a1" and "b1" is equal to "3" and thus the judgement result becomes "YES", the process is advanced to a step B11. At this step B11, a judgement is performed whether or not the changing pixel "a1" is positioned at an intermediate position between the changing pixels "b1" and "b2". In other words, it is judged whether or not $b1 \leq a-1 < b2$. In this embodiment, as the changing pixel "a1" is located at an intermediate position between the changing pixels "b1" and "b2" and thus the judgement result becomes "YES", the process is advanced to a step B12 at which the b1-flag 7 is reset to "0" and thereafter the process is advanced to a step B13 at which the coding operation in the vertical mode is performed. It should be noted that the coding operation in the vertical mode is the same as in the MR system. Then, the changing pixel "a1" is set to the changing pixel (a0) for the next coding operation at a step B14, and subsequently, the process is advanced to a step B15 at which the changing pixel "b2" is set to the changing pixel (b1), and thus the process is returned to the previous step B4 via a step B16.

At the step B4, a changing pixel (a1) is newly detected and the process is advanced to the step B5. In this case, since the b1-flag 7 has been reset to "0" and the judgement result is "NO", namely as the changing pixel "b1" has been obtained at the previous step B15, the process jumps over the step B6 and is advanced to the step B7 at which a check is made whether or not the changing pixel "a1" is smaller than and equal to the changing pixel "b1". In this case, since the changing pixel (a1) is positioned at a right side of the changing pixel (b1) and the judgement result becomes "NO", the process is advanced to the step B8 at which the changing pixel (b2) is detected and thus the operations defined after the above-described step B9 are carried out, so that the vertical mode as described in the step B13 is performed.

It should be noted that when the judgement result becomes "YES" at the judgement step B7 whether or not the changing pixel "a1" is smaller than or equal to the changing pixel "b1" because the changing pixel (a1) is positioned at a left side of the changing pixel (b1), the process is advanced to the step B17 at which another judgement is made whether or not $|a1\ b1|>3$. Then, if a judgement is made such that the relative distance between the changing pixels "a1" and "b1" is smaller than "3" and the judgement result becomes "NO", the b1-flag 7 is set to "1" at the step B18 and the vertical mode at the step B13 is performed. In this case, the reason why the b1-flag 7 is set to "1" at the step B18 even under the vertical mode is that the detection of pixel "b2" defined at the step B8 is not carried out. Accordingly, the correct changing pixel "b1" is detected through the step B8 at the subsequent flow. Though the changing pixel "b1" has been set by the changing pixel "b2" at the step B15, the correct changing pixel "b1" may be detected at the succeeding step B6, and the subsequent coding process becomes the normal coding process.

Figure 2:
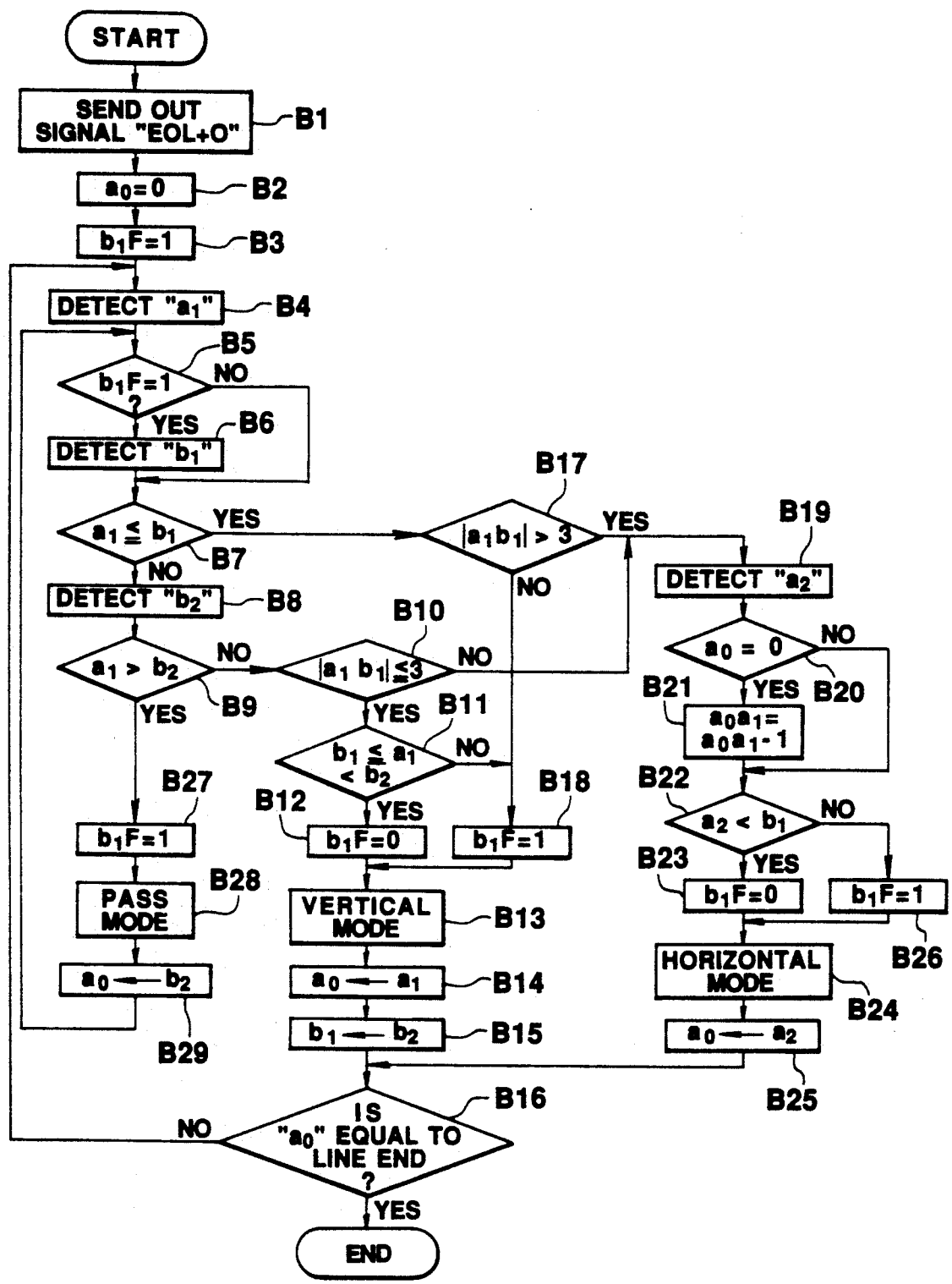
FIG. 2 is a flowchart for explaining an improved MR coding operation according to the present invention.
Figure 3:
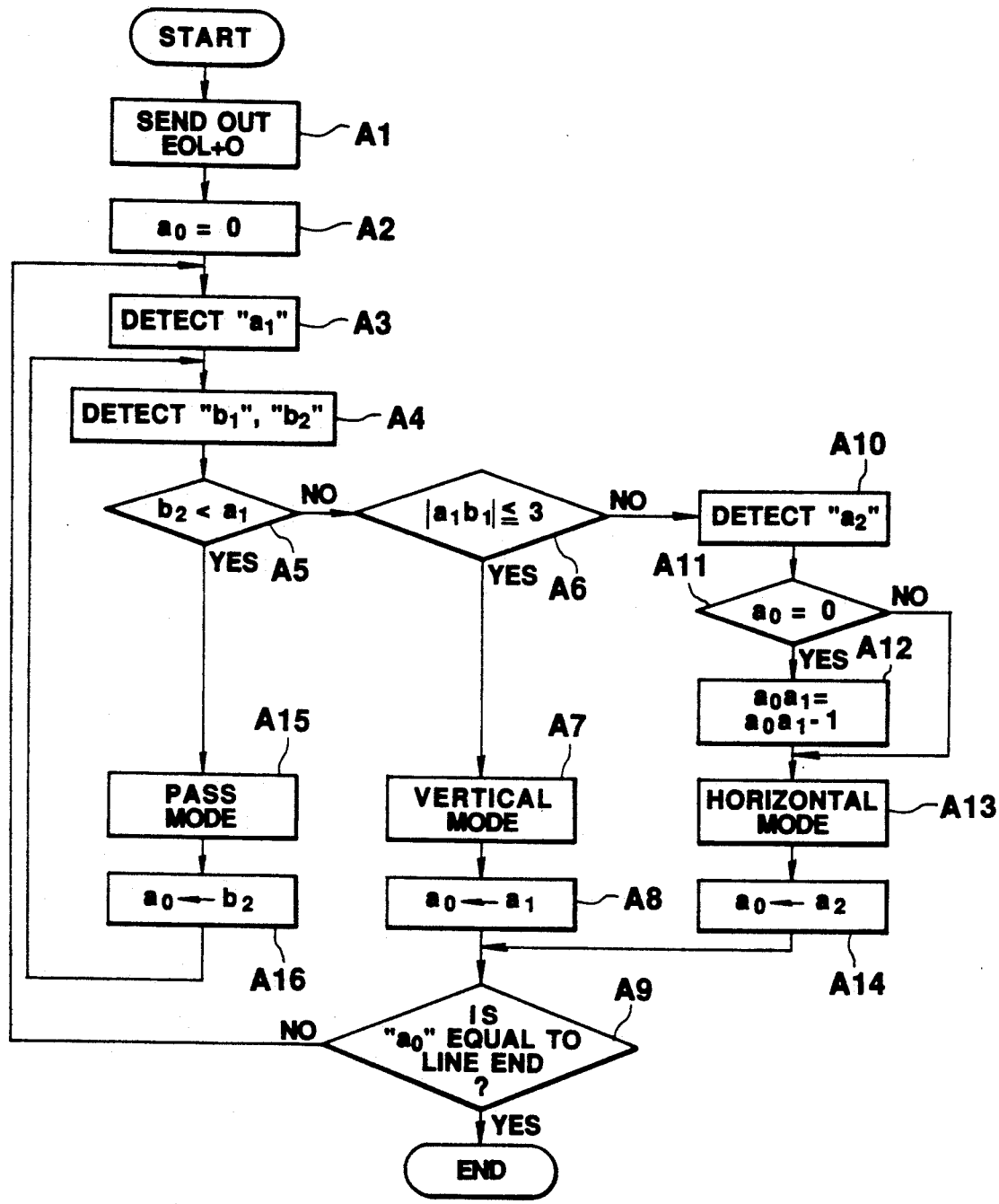
FIG. 3 is a flowchart for explaining the conventional MR coding operation.

Subsequently, the process flow as represented in FIG.2 is repeatedly performed in the similar manner to the previous manner, whereby the coding operation is carried out with respect to the image data having 1 line length. When the judgement result becomes "YES" at the step B16, the two-dimensional coding process is completed.

As a consequence, in accordance with such a coding operation in the vertical mode, when the changing pixel "a1" is set to the changing pixel (a0) for the subsequent coding operation, since the changing pixel (b1) positioned at the right side of the changing pixel (a0) is the same as the previous changing pixel "b2", the previous changing pixel "b2" may be newly used as the changing pixel (b1). Accordingly, the unnecessary detections for the changing points during the coding operation may be prevented and the coding speed may be increased.

Figure 4B:
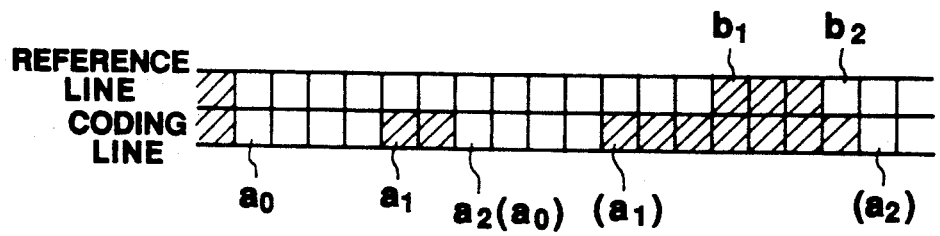

Next, in case that the image data as represented in FIG. 4b is processed, a detection is made at the step B4 and the process is advanced to the step B5 at which it is judged whether or not "b1F=1". In this case, if the b1-flag 7 is set to "1", then the judgement result becomes "YES", and the process is advanced to the step B6 at which changing pixel "b1" is detected. Thereafter, the process is advanced to the step B7. At this step B7, a check is made whether or not the changing pixel "a1" is smaller than or equal to the changing pixel "b1". In this case, since the changing pixel "a1" is positioned at a left side of the changing pixel "b1" and the judgement result becomes "YES", the process is advanced to the step B17 at which a judgement is made $|a1\ b1|>3$. In this case, since the relative distance between the changing pixels "a1" and "b1" is higher than 3 and the judgement result becomes "YES", the process is advanced to the step B19 at which the changing pixel "a2" is detected. Thereafter, the process is advanced via the steps B20 and B21 to the step B22. At this step B22, a judgement is made whether or not the changing pixel "a2" is smaller than the changing pixel "b1". In this case, since the changing pixel "a2" is positioned at a left side of the changing pixel "b1" and the judgement result becomes "YES", the process is advanced to the step B23, at which the B1-flag 7 is reset to "0" and the process is advanced to the step B24 at which the coding operation in the horizontal mode is performed. Then, at the next step B25, the changing pixel "a2" is set to the changing pixel (a0) for the subsequent coding operation, and the process is returned to the step B4 via the step B16.

At the step B4, the changing pixel (a1) is newly detected and the process is advanced to the step B5. At this step B5, the B1-flag 7 has been reset to "0" and therefore the judgement result is "NO", so that the process is advanced to the step B7, passing over the step B6, at which a judgement is performed whether or not the changing pixel "a1" is smaller than or equal to the changing pixel "b1".

As a result, in accordance with such a coding operation by the horizontal mode, when the changing pixel "a2" is set to the changing pixel (a0) for the next coding operation, since both the changing pixels "b1" and "b2" positioned at the right side of the changing pixel (a0) are the same as the previous changing pixels "b1" and "b2", the detecting operations can be avoided. That is to say, since the changing pixels "b1" and "b2" which have been once detected in the flow operation may be again used at next coding process, the unnecessary detecting operations for the changing points during the coding operation can be avoided, whereby the highspeed coding operation may be realized.

What is claimed is:

1. A facsimile apparatus for coding an image in an MR coding method, comprising:

a memory for storing therein binary-coded image data;

detecting means for sequentially reading out pixel data of both a coding line and a reference line from the image data stored in said memory, so as to detect changing points from "1" to "0" and from "0" to "1";

storage means for storing positional data on a pixel corresponding to the changing points detected by said detecting means, said positional data relating to changing pixels "a0", "a1","a2","b1", and "b2" employed in an MR coding operation;

first judging means for judging whether or not the changing pixel a1 is positioned in between the changing pixels "b1" and "b2" in a coding operation of a vertical mode; and control means for prohibiting a new detecting operation for changing pixel "b1" with respect to a subsequent coding process when said first judging means judges that the changing pixel "a1" is present between the changing pixels "b1" and "b2", thereby to rewrite a positional data of the changing pixel "b1" stored in the storage means by a positional data of the changing pixel "b2".

2. A facsimile apparatus as claimed in claim 1, further comprising:

second judging means for judging whether or not changing pixel "b1" is positioned at a right side of and changing pixel "a2" in an coding operation of the horizontal mode, and wherein said control means includes means for prohibiting a detection operation for a new changing pixel "b1" in a subsequent MR coding process when said second judging means judges that the changing pixel "b1" is positioned at a right side of the changing pixel "a2".

3. A facsimile apparatus as claimed in claim 2, wherein said control means further includes further storage means for storing judging means, and means for determining whether or not the detection operation of the changing pixel "b1" is performed in accordance with a content of said further storage means.

4. A facsimile coding system with employment of an MR coding process, comprising:

first detecting means for detecting that a changing pixel "a1" on a coding line is positioned between changing pixels "b1" and "b2" on a reference line in a vertical mode;

means for prohibiting a new search for the changing pixel "b1" when said first detecting means detects that the changing pixel "a1" is present between the changing pixels "b1" and "b2"; and means for positioning the changing pixel "b1" to be detected in a new search in the MR coding process, onto the changing pixel "b2" which has been searched for during a previous MR coding process.

5. A facsimile coding system as claimed in claim 4, further comprising:

storage means for storing a detection result of said first detecting means, and wherein said prohibiting means includes means for judging said content of a storage means.

6. A facsimile coding system as claimed in claim 4, further comprising:

second detecting means for detecting that a changing pixel "a2" on the coding line is positioned at a left side of the changing pixel "b1" on the reference line in a horizontal mode; and means for prohibiting a new search for the changing pixel "b1" when said second detecting means detects that the changing pixel "a2" is present at a left side of the changing pixel "b1", the changing pixel "b1" which has been searched for in the previous MR coding process being employed in a succeeding MR coding process.

7. A facsimile coding system as claimed in claim 6, further comprising:

storage means for storing a detection result of said second detecting means, and wherein said prohibiting means includes means for judging a content of said storage means.

* * * * *